No. 812,784. PATENTED FEB. 13, 1906.
H. C. CLAY & M. T. REEVES.
BAND CUTTER.
APPLICATION FILED JAN. 5, 1905.
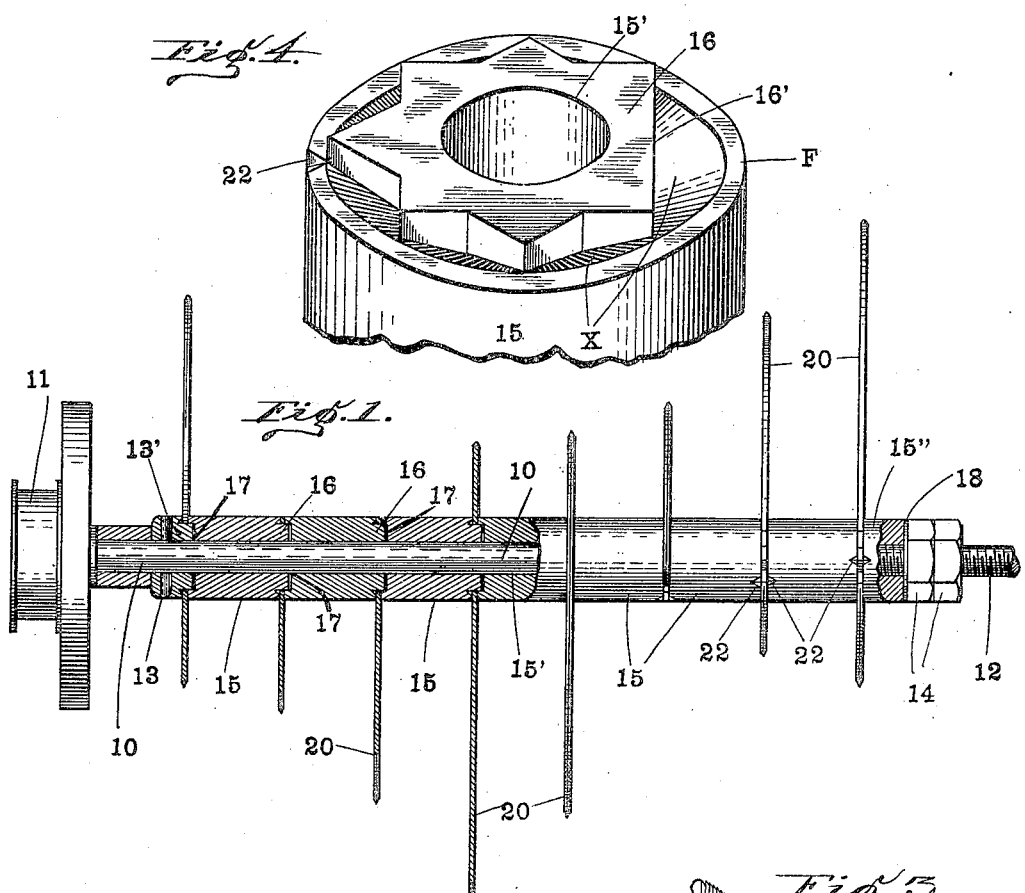
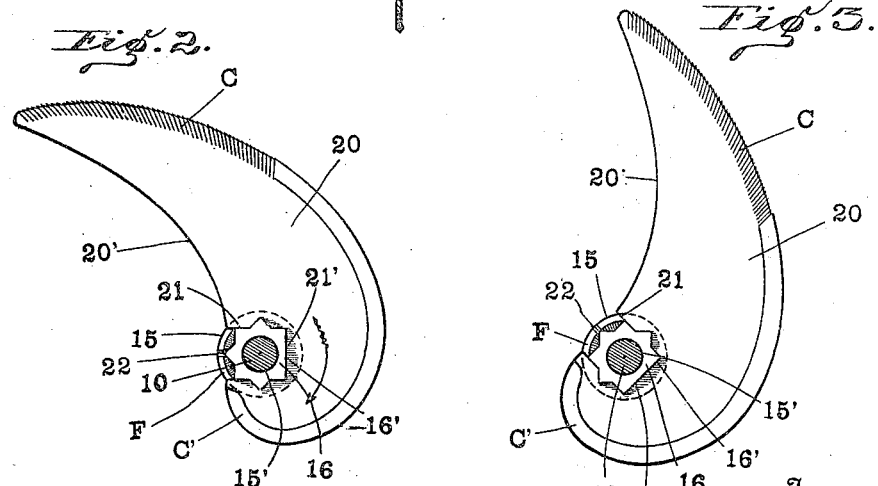
Witnesses
Frank A. Fahle
J. A. Walsh
Inventors
Harry C. Clay
Marshal T. Reeves
By Bradford Hood
Attorneys

UNITED STATES PATENT OFFICE.

HARRY C. CLAY AND MARSHAL T. REEVES, OF COLUMBUS, INDIANA, ASSIGNORS TO REEVES & COMPANY, OF COLUMBUS, INDIANA, A CORPORATION OF INDIANA.

BAND-CUTTER.

No. 812,784.　　　Specification of Letters Patent.　　　Patented Feb. 13, 1906.

Application filed January 5, 1905. Serial No. 239,826.

*To all whom it may concern:*

Be it known that we, HARRY C. CLAY and MARSHAL T. REEVES, citizens of the United States, residing at Columbus, in the county of Bartholomew and State of Indiana, have invented certain new and useful Improvements in Band-Cutters, of which the following is a specification.

In a band-cutter and feeder construction several knives are attached to a rotating shaft; but heretofore with but few exceptions the knives have been perforated and slipped endwise over the carrying-shaft being spaced apart by suitable intermediate thimbles. In such construction difficulty is experienced in removing the knives for sharpening, as it is necessary to withdraw the entire shaft from its bearing. In such an arrangement there is also difficulty in returning the several parts to initial position, so as to insure balancing of the structure.

The object of our present invention is to provide a band-cutter structure in which an ordinary round shaft may be employed and from which the knives may be laterally withdrawn, the construction being such, however, that the parts may be quickly assembled and disassembled and may always be returned to initial position.

The accompanying drawings illustrate our invention.

Figure 1 is a partial axial section and partial side elevation of an embodiment of our invention. Fig. 2 is a detail transverse section of one of the knives and its holder; Fig. 3, a similar view of the next succeeding knife, and Fig. 4 an isometric perspective of one end of one of the retaining spacer-sleeves.

In the drawings, 10 indicates a shaft of any desired cross-section, but preferably round. This shaft is provided with a suitable driving-pulley 11 at one end and is threaded, as at 12, near its other end. The shaft 10 is extended to the right beyond what is shown in the drawings to a bearing portion which is journaled in a suitable bearing. Secured to the shaft 10 near one end is a collar 13, and arranged between this collar and the nuts 14 on the threaded portion 12 of the shaft is a series of spacing-sleeves 15. Each sleeve 15 is provided at one end with a central polygonal boss or projection 16, which is preferably unsymmetrical with relation to the central bore 15′, as at 16′. The opposite end of each sleeve 15 is provided with a socket 17, which is adapted to receive the boss 16 of the adjacent sleeve. The collar 13 is provided with a boss 13′, adapted to fit within the socket 17 of the adjacent sleeve 15, and the final sleeve 15″ will have its outer end plain in order to receive a washer 18, which is engaged by the inner nut 14. In order to stagger the cutters around the shaft, the boss 16 of one sleeve is set in slight angular advance of the boss of the adjacent sleeve, so that the boss and socket of any particular sleeve are not similarly placed, but instead one is in slight angular advancement of the other. The knives 20 are of any desirable form; but each knife is provided with a polygonal notch 21, which opens from the back edge 20′ of the cutter and is of a form adapted to receive and to fit closely one of the bosses 16, the portion 21′ of this slot, which corresponds to the unsymmetrical portion 16′ of the boss 16, lying, preferably, immediately opposite the open end of the notch.

The knife 20 is provided at the tip of its forward edge with a suitable cutting portion C. In view of the opening in the rear edge caused by the notch 21′ there may possibly be a tendency to catch the material and wrap it about the shaft, and in order to insure against this we sharpen the heel of the cutter immediately adjacent the slot 21, as at C′, so as to prevent any possibility of wrapping.

In order to balance the structure properly and in order to prevent any possibility of twisting or crooking the shaft when the nuts 14 are tightened, we prefer to provide each sleeve 15 at each end with a trued face F, between two of which each blade 20 is clamped. The sleeves 15 are preferably cast, and in order to insure smooth sides of the boss 16, at least so far as they enter through the blades, the boss end of each sleeve 15 is cupped around the boss, as at X, so that the sides of the boss extend beneath the plane of the finished surface F, so that in casting if there are any irregularities at the inner ends of the axial surfaces of the boss 16 they will lie beneath this finished surface F. In order to facilitate the return of the several parts to normal position, we provide the adjacent ends of the sleeves 15 with a designating-mark 22—as, for instance, a slight notch—and this mark is preferably arranged immediately adjacent the open end of the notch 21 when the knife-blade is in position, so that it thus facilitates the positioning of each knife-blade.

In operation to assemble the parts the sleeves 15 are strung upon the shaft and the nuts 14 brought partially to position. A knife-blade may then be inserted between two sleeves in a direction transverse to the axis, the open end of the notch 21 permitting this transverse movement, and this open end is brought opposite the designating-mark 22. The knife-blade is then slipped longitudinally over the boss 16. The next adjacent sleeve 15 will then be turned until its designating-mark comes into alinement with the designating-mark of the sleeve upon which the knife has been slipped, whereupon a slight axial movement of this sleeve will bring the parts together. The polygonal shape of the boss 16 and the corresponding shape of the notch 21 will then prevent any transverse removal of the knives when the parts are assembled as described, and when the several knives have been arranged in the manner described they may all be securely clamped in position by the nuts 14. To remove any cutter, it is merely necessary to loosen the nuts 14 and separate the two adjacent sleeves 15 to withdraw the boss of one from the socket of the other and give in addition sufficient room for the thickness of the knife. Thereupon the knife may be slipped axially to withdraw it from the boss and then transversely to withdraw it from the shaft.

It will be readily understood that many forms of boss and corresponding knife-blade notch may be used without departing from our invention, it being merely necessary that the open end of the notch be of a width equal to or slightly greater than a shaft diameter. The shape of the boss and slot, however, must be such as to prevent transverse withdrawal of the knife when it is upon the boss. In this connection it will be readily apparent that a round shaft is not essential, although it is undoubtedly the most economical. The width of the open end of the knife-notch also need not be equal to or greater than every diameter of a common shaft, but equal to or slightly greater than some particular adjacent shaft diameter. In other words, transverse peripheral notches might be cut in the shaft adjacent the end of each spacing-sleeve and the slot in the knife be made of such size as to only permit transverse withdrawal of the knife when brought into conjunction with these transverse grooves in the shaft, without departing from the spirit of our invention.

We claim as our invention—

1. The combination, with a shaft and spacing-sleeves carried thereby, of a boss carried by one of said sleeves and extending axially into a socket formed in the adjacent sleeve, the said boss having one transverse dimension of less magnitude than a parallel dimension at greater distance from the axis, a knife having an open notch formed in one edge thereof and fitting said boss, the said open socket being of less width at its open end than the width farther in, whereby the knife when applied to the boss may not be transversely withdrawn, and means for clamping the sleeves together upon the knife.

2. The combination, with a shaft, of a knife having an open notch formed in one edge, said notch having a transverse dimension near its open end less than a parallel dimension near the inner end of the notch, means carried by the shaft for entering and fitting said notch, spacing-sleeves mounted on the shaft, and means for clamping the sleeves together upon the knife.

3. The combination, with a round shaft, of a series of sleeves freely rotatably thereon, each sleeve being provided at one end with a non-cylindrical boss and at the other end with a socket adapted to receive the boss of the adjacent sleeve, a collar secured to the shaft and adapted to coact with the adjacent sleeve, the said sleeves being provided on their adjacent ends with annular clamping-surfaces between which knives may be clamped, a series of knives each provided in its back edge with an open notch adapted to receive the boss of a sleeve, said notch and boss fitting and the notch having a transverse dimension near its open end less than a parallel dimension near the inner end, thus being of such character as to prevent transverse withdrawal of the knife when in position, and means for clamping the several sleeves together on the shaft.

4. In a cutter structure, a knife-holding sleeve consisting of a bored main body having a boss at one end and at the other end a corresponding socket adapted to receive the boss of an adjacent sleeve, said sleeve being provided at each end with a trued annular surface at an angle to the axis of the sleeve, and a cutter-blade clamped between the trued surfaces of adjacent sleeves so as to rotate therewith.

5. In a cutter structure, a knife-holding sleeve consisting of a bored main body having a boss at one end and at the other end a corresponding socket adapted to receive the boss of an adjacent sleeve, said sleeve being provided at each end with a trued annular surface at an angle to the axis of the sleeve, and having a cupped portion between said trued annulus and the boss, and a cutter-blade clamped between the trued surfaces of adjacent sleeves so as to rotate therewith.

6. In a cutter structure, a knife-holding sleeve consisting of a bored main body having at one end a non-cylindrical boss and at the other end a corresponding socket adapted to receive the boss of an adjacent sleeve, said sleeve being provided with an external marking means to indicate its proper relationship to the adjacent sleeves.

7. A knife for a cutter structure having a notch cut in its rear edge, the open end of said notch being of less width than other portions of the notch.

8. A knife for a cutter structure having a notch cut in its rear edge, the open end of said notch being of less width than other portions of the notch and both the tip and the heel of the cutter adjacent the notch being sharpened.

In witness whereof we have hereunto set our hands and seals, at Columbus, Indiana, this 2d day of January, A. D. 1905.

HARRY C. CLAY. [L. S.]
  MARSHAL T. REEVES. [L. S.]

Witnesses:
 HARRY O. WAY,
 FRED DOELLER